United States Patent [19]

Alfano

[11] 4,419,877
[45] Dec. 13, 1983

[54] METHOD OF MANUFACTURING A CYLINDRICAL SLEEVE PROVIDED WITH INTERNAL GROOVES, AND TOOL FOR CARRYING OUT THIS METHOD

[75] Inventor: Carmel Alfano, Saint Brice sous Foret, France

[73] Assignee: Societe Anonyme DBA, Paris, France

[21] Appl. No.: 380,856

[22] Filed: May 21, 1982

Related U.S. Application Data

[62] Division of Ser. No. 109,708, Jan. 4, 1980, abandoned.

[30] Foreign Application Priority Data

Jan. 16, 1979 [FR] France ................................ 79 00949

[51] Int. Cl.³ .............................................. B21K 21/12
[52] U.S. Cl. ....................................... 72/325; 72/340; 72/370
[58] Field of Search .......................... 72/325, 340, 370; 29/597, 149.5 R

[56] References Cited

U.S. PATENT DOCUMENTS

| | | | |
|---|---|---|---|
| 1,422,655 | 7/1922 | Brehmer | 29/149.5 R |
| 1,870,970 | 8/1932 | Stevenson. | |
| 2,382,349 | 8/1945 | Taylor. | |
| 2,963,774 | 12/1960 | Pike | 29/597 |
| 3,157,943 | 11/1964 | Wurzburger | 72/340 |
| 3,177,562 | 4/1965 | Worner et al. | 29/597 |

FOREIGN PATENT DOCUMENTS 771256 3/1957 United Kingdom.

Primary Examiner—Lowell A. Larson
Attorney, Agent, or Firm—Paul David Schoenle; Ken C. Decker

[57] ABSTRACT

Method of manufacturing a cylindrical sleeve provided with longitudinal internal grooves closed at at least one of their ends, these grooves being preformed by broaching in a section of reduced internal diameter of the sleeve blank delimited by two shoulders; To close the ends of the grooves at the level of at least one of the shoulders, the invention makes provision for the deformation of the latter by the pressing back of material in the direction of the axis of the sleeve so as to constitute a continuous annular bead of a depth at least equal to that of the grooves and for the subsequent boring of the sleeve to the required diameter so as to remove the excess part of this bead; Application in particular is to the machining of rotary valve sleeves for power-assisted steering gear.

2 Claims, 8 Drawing Figures

METHOD OF MANUFACTURING A CYLINDRICAL SLEEVE PROVIDED WITH INTERNAL GROOVES, AND TOOL FOR CARRYING OUT THIS METHOD

This is a division of application Ser. No. 109,708, filed Jan. 4, 1980, now abandoned.

The object of the present invention is a method of manufacturing a cylindrical sleeve provided with internal grooves of straight or slightly inclined longitudinal orientation closed at at least one of their ends; such sleeves are used in particular as rotary valve members in power-assisted steering gear for automobile vehicles. The object of the invention is also a tool specially designed for carrying out such a method.

Figure 1:
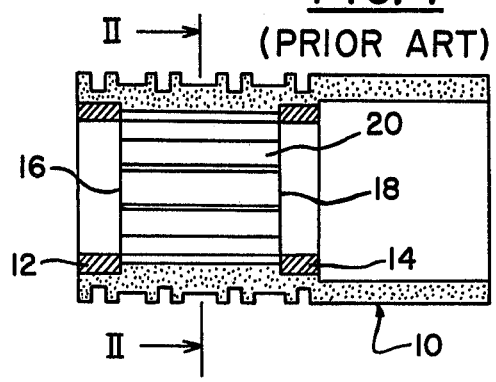
Figure 2:
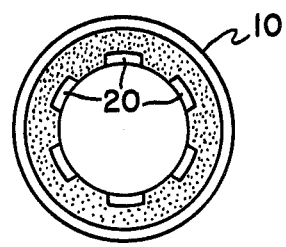

A known method of machining such sleeves, the product of which is illustrated in FIGS. 1 and 2 of the attached drawings in the frequently occurring case when the grooves must be closed at their two ends, consists in forming these grooves, in a first stage, by broaching or by passing of a similar cutting tool along a section of reduced internal diameter of the sleeve blank which is delimited by two shoulders, so that the said grooves open into the space at the level of the latter. The ends of these grooves are then sealed, thanks to the placing of two closing rings applied contiguously against the aforesaid shoulders and having the same internal diameter as the finished machined sleeve. To obtain absolute immobilisation of the closing rings inside the sleeve, it is the usual practice to fit the latter by thermal contraction and expansion. While this known method offers the advantage of allowing easy and accurate machining of the grooves themselves by broaching, it does, however, present the drawback of necessitating additional accurate machinings for the seats for the closing rings as well as for the rings themselves, which considerably increases the cost price and unfortunately obliges one to keep a stock of pieces awaiting assembly. Furthermore, the method runs the risk of causing deformations in the part after fitting the rings.

Figure 3:
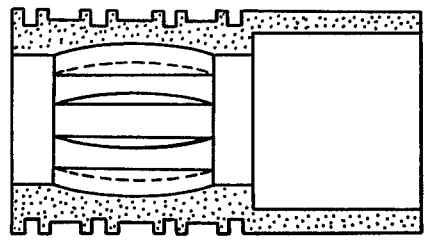

Another known method, the product of which is illustrated in FIG. 3 of the attached drawings, consists in forming the grooves by cutting by means of a cutting tool moved in a curvilinear trajectory thanks to a suitably designed machine, such as, for example, that described in French Pat. No. 2 004 355. The grooves then no longer have a constant depth and, because they do not open out at the level of the shoulders limiting the section of reduced diameter of the sleeves, it is no longer necessary to make provision for closing rings. This advantage is, however, only obtained at the cost of a special machine representing a considerable investment, ill adapted to high rates of production and incapable of guaranteeing as accurate a machining of grooves as that obtained with the previous method.

Consequently, the aim of the present invention is to design a method of machining which, while allowing one to retain the advantages of accuracy and speed in making the grooves inherent in their execution by broaching, avoids recourse to closing rings and thus eliminates the drawbacks involved in their use.

This aim is achieved, in conformance with the invention, thanks to the fact that, to close the ends of the grooves at the level of at least one of the shoulders, the latter is deformed by pushing back the material in the direction toward the axis of the sleeve so as to constitute a continuous annular bead of a radial depth at least equal to that of the grooves after machining, and that the sleeve is subsequently bored to the required diameter so as to leave only the part of this bead corresponding to the said radial depth. The grooves thus obtained are consequently constant in depth, except in the neighborhood of their closed end or of their closed ends where they end in an oblique bevel.

In a preferred manner of carrying out the method of the invention, the operation of pushing back material is effected by the application of pressure of longitudinal orientation on an annular region of the shoulder concerned, whose mean diameter is greater than the diameter at the base of the grooves and by simultaneous guiding the material pushed back toward the axis of the sleeve.

The invention also concerns a tool for carrying out the aforesaid method, a tool peculiar in that it comprises at least one punch whose straight edge has an external diameter substantially equal to the largest diameter of the shoulder concerned, and whose engaging face includes a shallow central impression whose flat base is connected to the peripheral edge of the punch by an element of concave surface with a relatively large radius of curvature.

Figure 4:
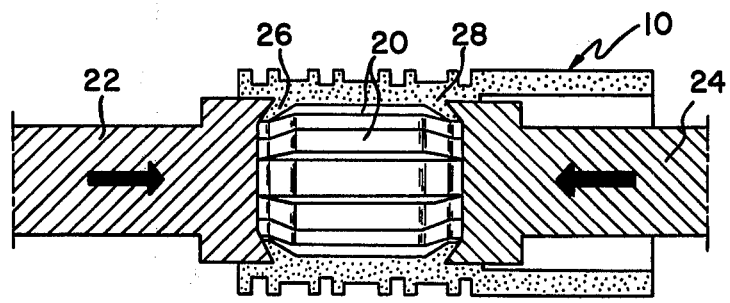
Figure 5:
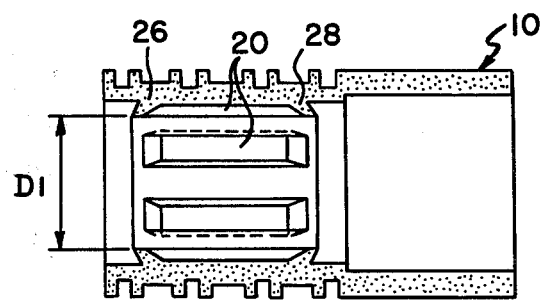
Figure 6A:
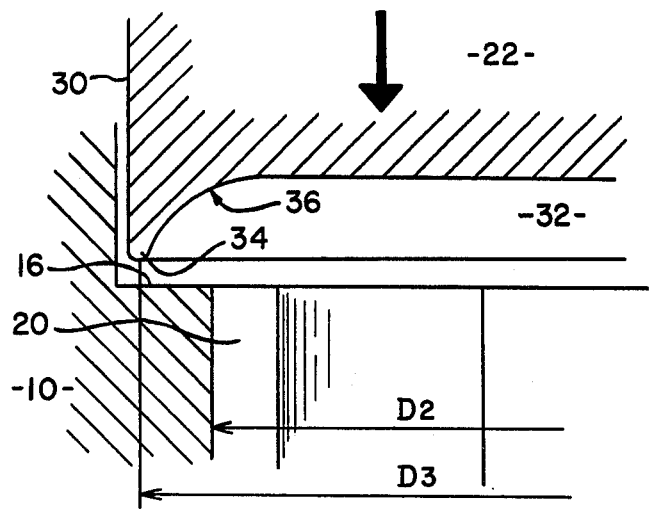
Figure 6B:
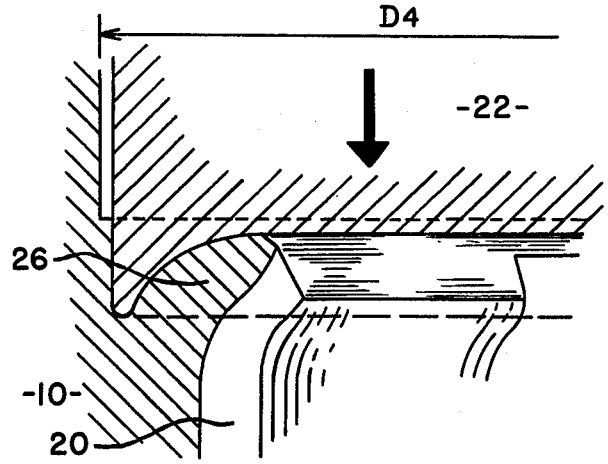
Figure 6C:
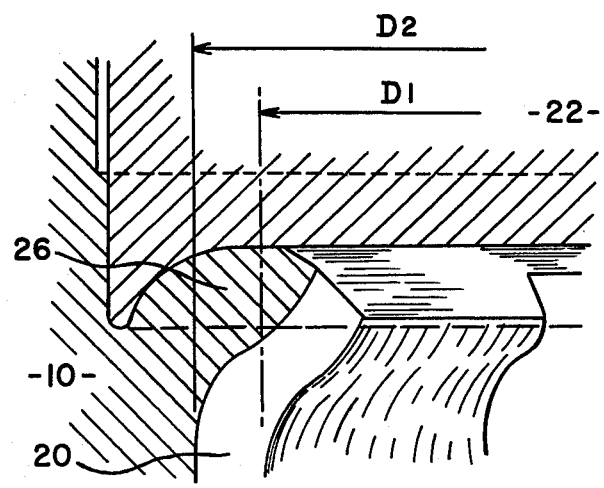

The characteristics and advantages of the invention will be more evident from a reading of the following description of a preferred manner of execution, given by way of illustrative example and with reference to the attached drawings, in which:

FIG. 1, already mentioned above, represents in longitudinal section a cylindrical sleeve provided with straight internal grooves closed at their two ends, this sleeve, usable as a rotary valve member, being obtained by application of a first known machining method;

FIG. 2 is a transverse section of the socket of FIG. 1, taken at the arrows II—II of FIG. 1;

FIG. 3, also already mentioned above, illustrates in longitudinal section and in a similar way to FIG. 1 a grooved cylindrical sleeve obtained by application of a second known machining method;

FIGS. 4 and 5 represent, also in longitudinal section, and respectively in the course of machining and at the end of the latter, a grooved cylindrical sleeve obtained by application of the method according to the invention; and FIGS. 6A, 6B and 6C are diagrammatic representations on a considerably enlarged scale illustrating by means of three successive views the process of pushing back the material which results in the closing of the end of the groove, in conformance with the method of the invention.

The carrying out of the method of the invention assumes the previous preparation of a sleeve blank 10 such as that illustrated in FIG. 1 of the attached drawings, but, of course, without the closing rings 12, 14 which are characteristic for the first known machining method which has been mentioned above. This sleeve blank which is intended to become a rotary valve member, comprises a section of reduced internal diameter which is delimited by two shoulders 16, 18. In this section of reduced diameter are formed, preferably by broaching, a certain number of longitudinal grooves 20, up to six in number and angularly equidistant from each other in the example concerned. At their ends, these grooves open into the space at the level of the shoulders 16 and 18. The radial depth of these grooves is chosen in such a way that the circle defining the position of their respective bases has a diameter slightly less than the maximal diameter of the shoulders 16 and 18.

To close the ends of the grooves 20 at the level of the shoulders 16 and 18, the method of the invention makes provision for the deformation of the latter by pushing back of material in the direction toward the axis of the sleeve in such a way as to constitute continuous annular beads with a radial depth at least equal to that which the grooves should exhibit at the end of machining. FIG. 4 of the drawings shows how this pushing back of material can be effected, in a preferred way of carrying out the method of the invention, by means of two punches 22, 24 applied in the axial direction and in opposite senses on the shoulders delimiting the section of reduced internal diameter of the sleeve blank 10. The drawing shows clearly the annular beads 26, 28 in the course of forming at the ends of the grooves 20. The shape of the punches, which will be described in more detail hereinafter, is so designed that these punches ensure an efficient guiding of the material pushed back in the direction toward the axis of the sleeve. At the end of this operation of pushing back material and provided that the annular beads 26, 28 are raised enough to provide no break of continuity at a radial depth at least equal to that of the grooves 20, it then only remains to bore the sleeve blank 10 to the final interior diameter $D_1$ to simultaneously remove the excess part of the annular beads 26 and 28. FIG. 5 of the drawings represents the consequent finished machined sleeve 10, and the longitudinal grooves 20 are seen to be effectively closed at the level of their two ends by obliquely orientated bevels which are simply the internal sides of the annular beads 26 and 28. It is therefore unnecessary to use the closing rings required until now.

FIGS. 6A, 6B and 6C illustrate on a very enlarged scale and in three successive stages the process for pushing back material which results in the formation of annular beads intended to close the ends of the longitudinal grooves 20. Moreover, they determine exactly the form given to the punches in a preferred embodiment of a tool for carrying out the method of the invention. As appears from these drawings, each of the punches 22 and 24 has a straight edge 30 whose external diameter is substantially equal to the greatest diameter $D_4$ of the corresponding annular shoulder 16, these two diameters simply exhibiting sufficient radial play therebetween to allow free engaging of the punch in the sleeve blank. The engaging face of the punch moreover includes a shallow central impression 32 whose flat base is connected to the peripheral edge 34 of the punch by an element of concave surface 36 of relatively large of radius curvature. The mean diameter $D_3$ of the peripheral edge 34 is thus substantially greater than the diameter $D_2$ of the base of the grooves 20 pre-machined in the sleeve blank 10. When the punch 22 goes into the annular shoulder 16 (FIG. 6B), pressure is thus applied on an annular region of this shoulder whose mean diameter is greater than the diameter $D_2$ of the base of the grooves, and the element of concave surface 36 as well as the base of the central impression 32 help to guide in the direction toward the axis of the sleeve the material pushed back by the penetration of the punch 22. FIG. 6C illustrates the position of the punch 22 at the end of the operation, the annular bead 26 then including a continuous portion of radial depth at least equal to that of the longitudinal grooves 20 (and corresponding to half the difference between the diameters $D_2$ and $D_1$), as well as a jagged marginal portion which will be removed in the subsequent operation of boring the sleeve blank 10 to the interior diameter $D_1$. The longitudinal grooves 20 are consequently understood to be effectively closed at their two ends by the truncated bases of the annular beads 26 and 28. So the finished machined sleeve looks just as represented in FIG. 5 of the drawings.

It should be clearly understood that the manner of carrying out the method according to the invention which has been described above represents only one of the possible implementations, and that it would be possible to have recourse to other means to obtain the pushing back of material which produces the annular beads for closing the grooves of the socket. Similarly, the method of the invention could be as equally well applied in the case of sleeves provided with internal grooves with direction inclined in relation to their axis. It could also be applied in the case where the grooves with which the sleeve is provided must be closed at only one of their ends, a single punch being used in this case. Furthermore, the scope of the invention should not be considered restricted to the exclusive instance of a cylindrical sleeve of circular section, even if the latter represents the main part of its area of application; on the contrary, the term "cylindrical" must be understood in its most general sense, according to the definition of it in classic geometry.

I claim:

1. A method for manufacturing a cylindrical sleeve provided with internal grooves extending axially between a pair of shoulders, the shoulders extending radially from a large diameter to a small diameter, the grooves defining a base diameter smaller than said large diameter and larger than said small diameter, said method comprising the steps of abutting a punch against at least one of said shoulders in order to deform said one shoulder, said punch abutting against said shoulder at a location between said large diameter and said base diameter, said one shoulder deformation causing the material of said one shoulder to extend radially inwardly inside said small diameter to substantially close said grooves adjacent said deformed one shoulder, said punch being formed with a shallow central impression whose flat base is connected to the peripheral edge of the punch by an element of concave surface with a relatively large radius of curvature, said abutting of said punch against said one shoulder deforming said one shoulder along said concave surface and along said flat base in order to define a continuous annular bead closing one end of said grooves, and machining said continuous annular bead to remove excess material for said deformed one shoulder radially inside said small diameter.

2. The method of claim 1 in which a pair of identical punches are abutted against said pair of shoulders, respectively, at the same time to deform said pair of shoulders and form a continuous annular bead at each end of said internal grooves.

* * * * *